US008686893B2

(12) United States Patent
Watanabe et al.

(10) Patent No.: US 8,686,893 B2
(45) Date of Patent: Apr. 1, 2014

(54) RADAR DEVICE

(75) Inventors: Yuu Watanabe, Toyota (JP); Koichiro Suzuki, Yokohama (JP); Chiharu Yamano, Tokyo (JP)

(73) Assignee: Denso Corporation, Kariya (JP)

( * ) Notice: Subject to any disclaimer, the term of this patent is extended or adjusted under 35 U.S.C. 154(b) by 205 days.

(21) Appl. No.: 13/298,556

(22) Filed: Nov. 17, 2011

(65) Prior Publication Data

US 2012/0127016 A1    May 24, 2012

(30) Foreign Application Priority Data

Nov. 19, 2010   (JP) ................................ 2010-259070

(51) Int. Cl.
| G01S 13/90 | (2006.01) |
| G01S 13/42 | (2006.01) |
| G01S 13/93 | (2006.01) |
| G01S 13/34 | (2006.01) |
| G08G 1/16 | (2006.01) |

(52) U.S. Cl.
CPC ............... *G01S 13/931* (2013.01); *G01S 13/42* (2013.01); *G01S 13/34* (2013.01); *G08G 1/16* (2013.01)
USPC .................................. 342/70; 342/71; 342/108

(58) Field of Classification Search
CPC ....... G01S 13/931; G01S 13/42; G01S 13/34; G01S 13/60; G08G 1/16
USPC ........... 342/70–72, 84–88, 90, 107–108, 111, 342/115–116, 128, 133, 139, 145–146, 189, 342/196; 701/301; 340/903, 435–436
See application file for complete search history.

(56) References Cited

U.S. PATENT DOCUMENTS

| 5,565,870 A * | 10/1996 | Fukuhara et al. ................ 342/70 |
| 7,339,518 B2 * | 3/2008 | Natsume et al. ................ 342/70 |
| 7,907,083 B2 * | 3/2011 | Sakamoto et al. .............. 342/70 |
| 2004/0246167 A1 | 12/2004 | Kumon et al. |

(Continued)

FOREIGN PATENT DOCUMENTS

| CN | 101334475 | 12/2008 |
| JP | 2004-191131 | 7/2004 |

(Continued)

OTHER PUBLICATIONS

M. Sekine, "Radar Signal Processing Technology", The Institute of Electronics, Information and Communication Engineers; Sep. 1991; pp. 96-103.

(Continued)

*Primary Examiner* — John B Sotomayor
(74) *Attorney, Agent, or Firm* — Harness, Dickey & Pierce, PLC

(57) ABSTRACT

A signal processing unit in a radar device calculates a change amount Y (=log(P)−log(Pb)) between a power P of a current arrival echo and a power of a previous arrival echo arrived before an observation period $T_{SW}$. A memory unit in the radar device stores, every type of objects, a probability distribution of the change amount Y calculated from the arrival echo from the object. On the basis of the calculated change amount Y and the probability distribution, the signal processing unit determines a probability Pr to obtain the change amount Y every type of object, and determines that the object having the maximum probability Pr is the object which transmits the current arrival echo.

9 Claims, 8 Drawing Sheets

(56) References Cited

U.S. PATENT DOCUMENTS

| | | | |
|---|---|---|---|
| 2006/0181448 A1* | 8/2006 | Natsume et al. | 342/70 |
| 2006/0187111 A1* | 8/2006 | Uchino | 342/70 |
| 2007/0008211 A1* | 1/2007 | Yamano et al. | 342/70 |
| 2008/0088498 A1* | 4/2008 | Suzuki et al. | 342/90 |
| 2009/0002222 A1 | 1/2009 | Colburn et al. | |
| 2010/0019954 A1 | 1/2010 | Mizutani et al. | |
| 2010/0073216 A1* | 3/2010 | Sakamoto et al. | 342/70 |
| 2010/0228482 A1* | 9/2010 | Yonak | 701/301 |

FOREIGN PATENT DOCUMENTS

| | | | | |
|---|---|---|---|---|
| JP | 2007-248480 | 9/2007 | | |
| JP | 2010-032314 | 2/2010 | | |
| WO | WO 2008105458 A1 * | 9/2008 | | G01S 13/42 |

OTHER PUBLICATIONS

Office Action issued Oct. 9, 2013 in corresponding CN Application No. 201110376447.5 (with English translation).

* cited by examiner

FIG.1
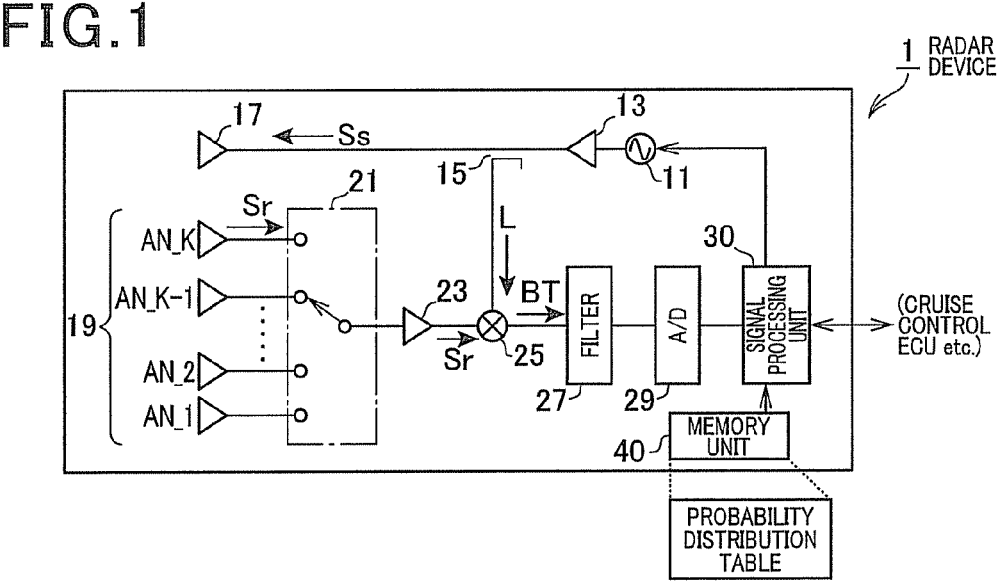
FIG.2A
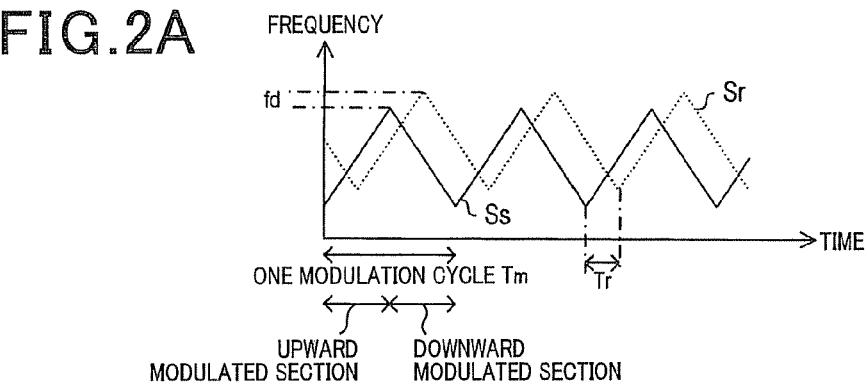
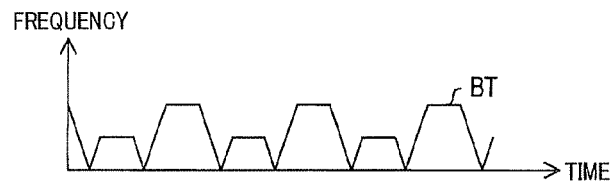
FIG.2B
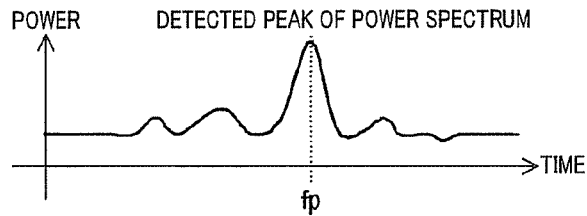

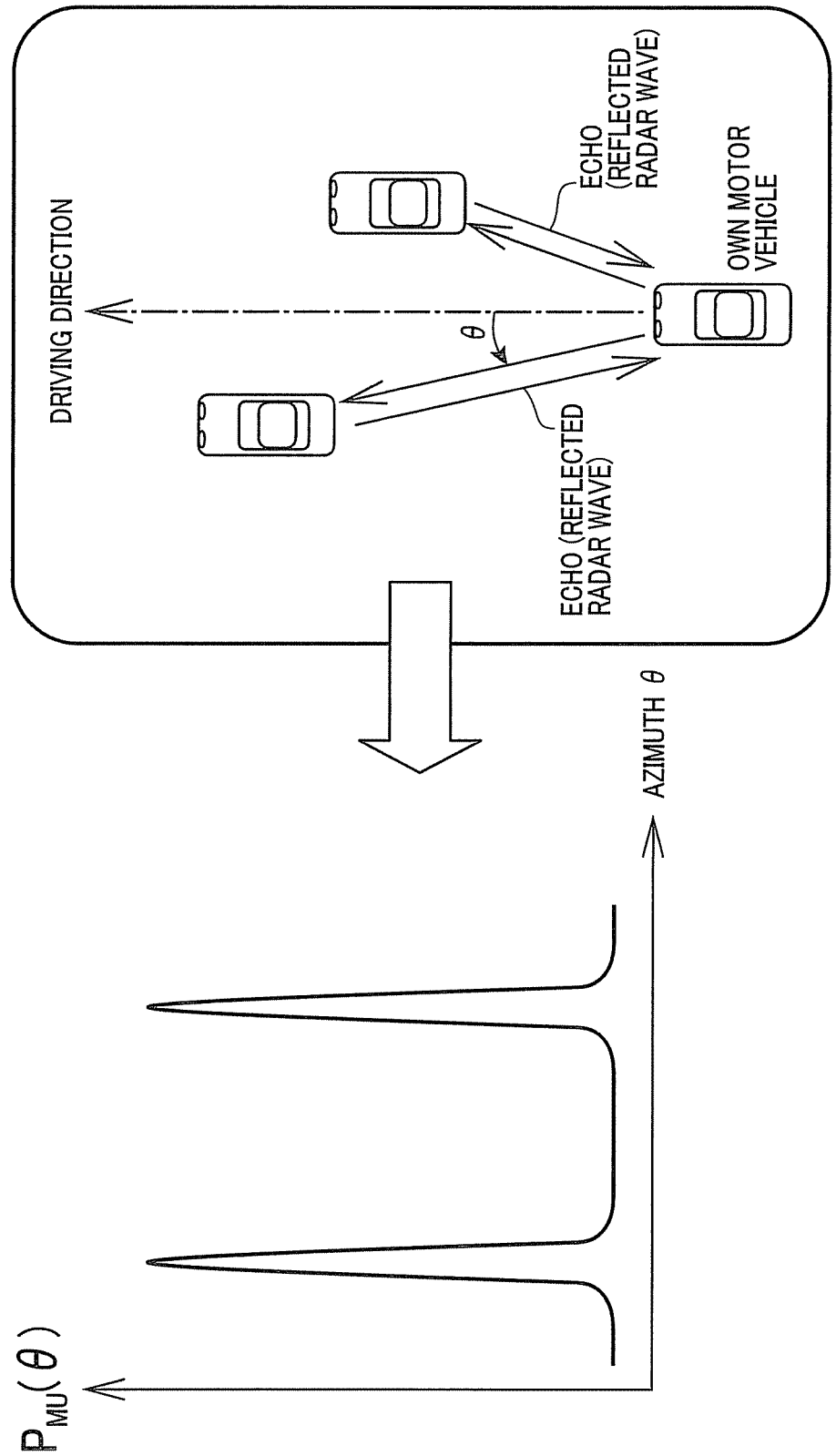

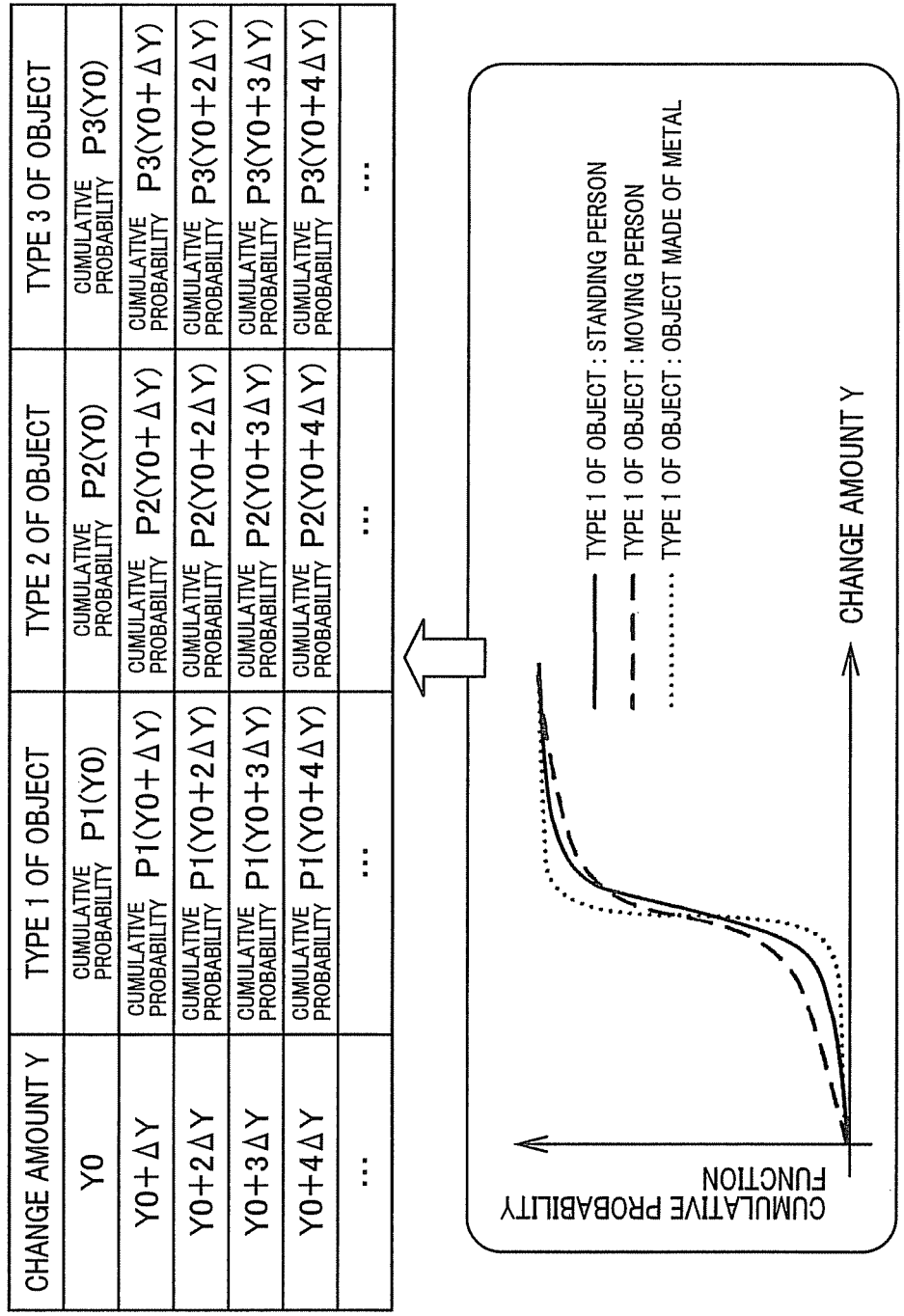

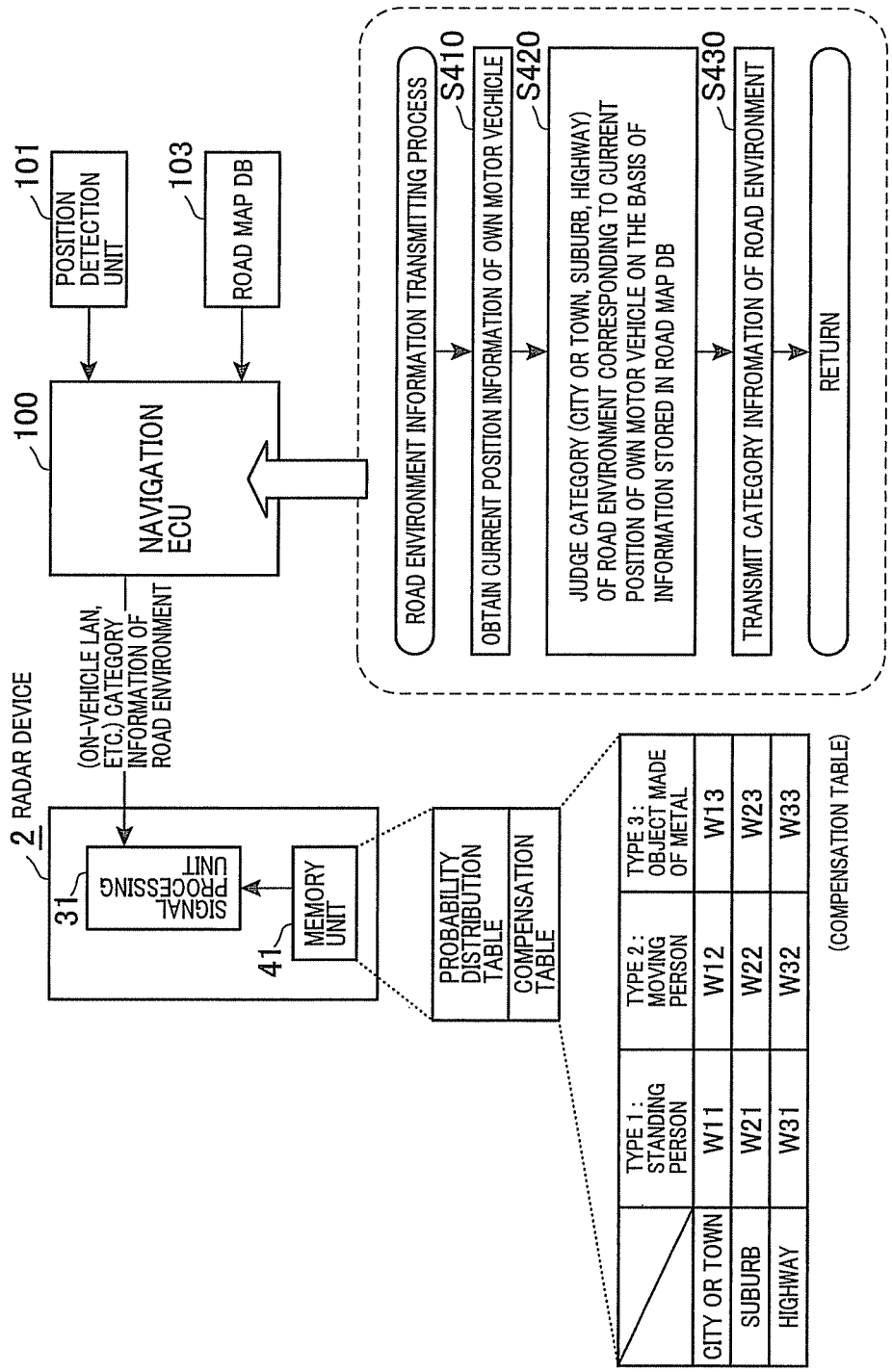

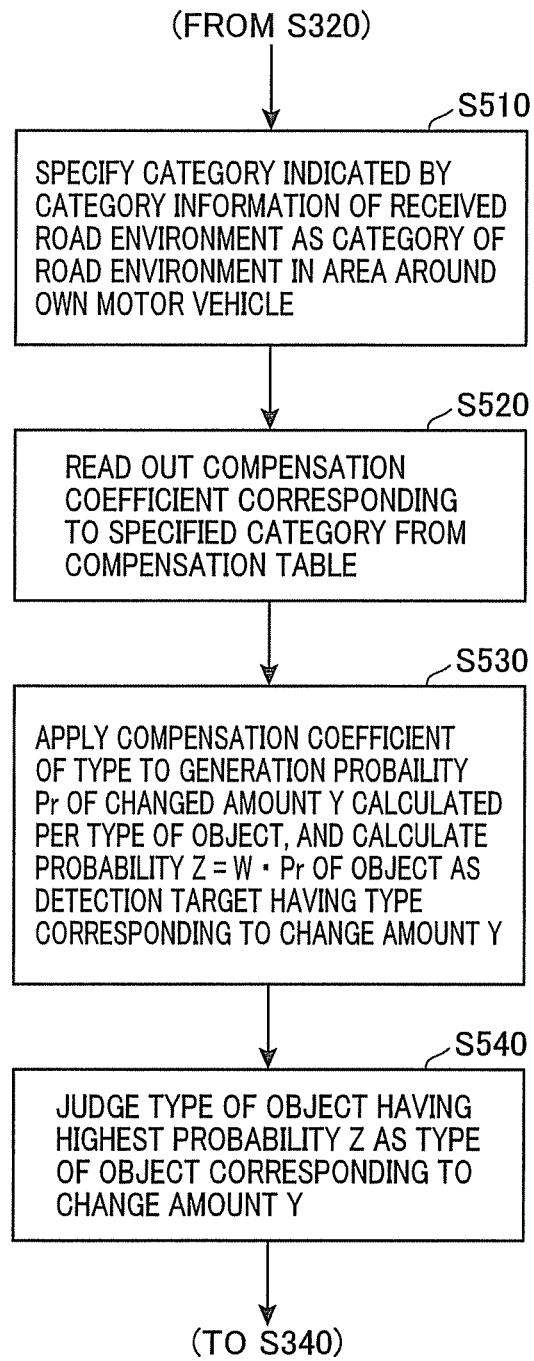

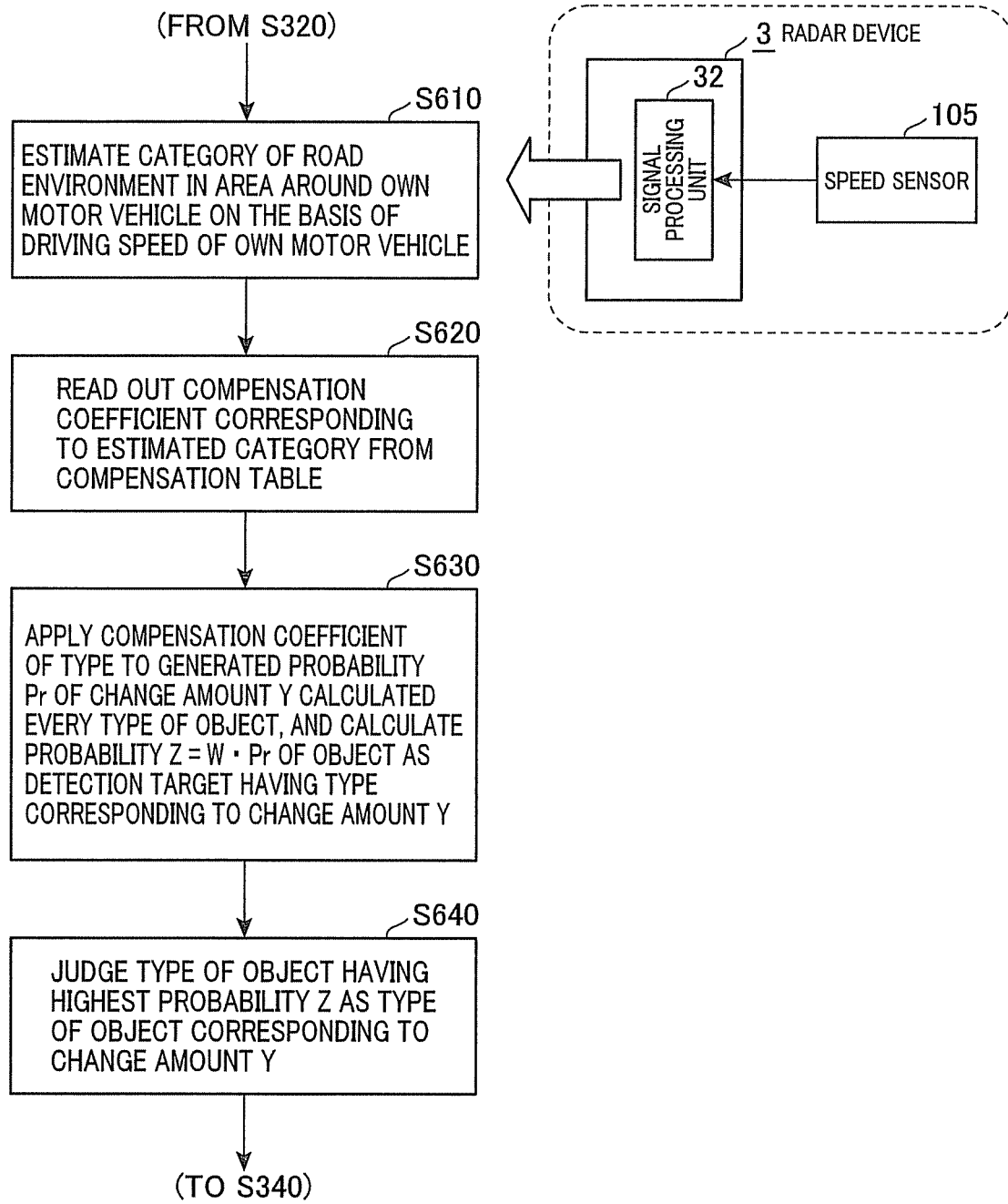

RADAR DEVICE

CROSS-REFERENCE TO RELATED APPLICATION

This application is related to and claims priority from Japanese Patent Application No. 2010-259070 filed on Nov. 19, 2010, the contents of which are hereby incorporated by reference.

BACKGROUND OF THE INVENTION

1. Field of the Invention

The present invention relates to radar devices.

2. Description of the Related Art

There are various radar devices which are widely used in various applications, for example, a motor vehicle field. Such a radar device emits radio waves from a transmitting antenna and receives echoes (reflected radar waves) reflected by objects as detection targets through a receiving antenna array. There is a front running vehicle as a front object as a detection target. Such a conventional radar device detects a distance between an own motor vehicle equipped with the radar device and an object on the basis of a time difference (delay) between a time of transmitting a radio wave and an arrival time of each echo. The radar device further estimates a relative speed between the own motor vehicle and the front object on the basis of a difference in frequency between the received arrival echo and the transmitted radio wave. Japanese patent laid open publication No. 2010-032314 discloses such a conventional radar device. For example, such a conventional radar device is mounted on a motor vehicle and a control unit executes a vehicle driving control on the basis of the arrival echoes of radio waves which are reflected by the front objects.

One of other known radar devices detects the presence of objects on the basis of a comparison result between the amplitude of a received signal of an arrival echo and a threshold value. Such a conventional radar device logarithmically amplifies the received signal of the arrival echo (as the radar wave reflected by an object) and subtracts an average value of the received signals of the arrival echo after the logarithmic amplification, before and after the currently received signal, from the currently received signal in order to suppress a probability of suppressing an incorrect detection of the presence of the object caused by clutter. Such a conventional radar device is disclosed in a technical document, "RADAR SIGNAL PROCESSING TECHNOLOGY", Matsuo Sekine, pp. 96-103, September 1991, "The Institute of Electronics, Information and Communication Engineers (IEICE)".

By the way, the conventional radar devices can detect a distance between the own motor vehicle equipped with the radar device and a front object, an azimuth of the front object and a relative speed between the own motor vehicle and the front object. However, the conventional radar devices cannot analyze and determine a type of each front object, for example, cannot determine what the detected front object is, for example a stopped motor vehicle, a running motor vehicle, standing human, walking human, a guard rail, or a traffic sign board.

The conventional radar devices only detect whether or not a received radar wave is reflected from a front object or generated by clutters.

SUMMARY OF THE PRESENT INVENTION

It is an object of the present invention to provide a radar device capable of detecting a type of each of front objects present in an area in front of the radar device, for example, mounted to an own motor vehicle, on the basis of received signals of arrival echoes reflected by the front objects.

To achieve the above purposes, the present exemplary embodiment provides a radar device having a transmitting and receiving means, a detection means, a change amount calculation means, a probability distribution memory means and a judgment means. The transmitting and receiving means emits radar waves and receives echoes of signals of the radar waves which are reflected by various types of objects as detection targets. The detection means detects a signal intensity of each arrival echo on the basis of the received signals of the arrival echo received by the transmitting and receiving means.

The change amount calculation means calculates a change amount Y. This change amount Y is a difference between a signal intensity P (or a signal power P) of the current arrival echo and a previous signal intensity Pb (or a previous signal power Pb) of the previous arrival echo. The previous signal intensity Pb of the previous arrival echo corresponds to the signal intensity P of the current arrival echo. The previous signal intensity Pb of the previous arrival echo is detected by the detection means before a predetermined observation period $T_{SW}$ counted from the time when the transmitting and receiving means receives the current arrival echo and the detection means detects the signal intensity P of the current arrival echo.

For example, the change amount Y of the echo is a power ratio (P/Pb) of the signal intensity P and the previous signal intensity Pb. When the signal intensities P and Pb are logarithmically amplified, it is possible to calculate a difference (log(P)−log(Pb)) between the signal intensity log(P) and the previous signal intensity log(Pb) after completion of the above logarithmical amplification.

The probability distribution memory means stores, every type of the object as the detection target, a probability distribution of the change amount Y of the echo transmitted from the object of each type. The probability distribution is calculated on the basis of the echo as the radar wave reflected by each type of the object and arriving at the transmitting and receiving means. For example, each probability distribution can be expressed by a cumulative distribution function and a probability density function or information tables instead of these functions. These functions or the information tables are stored in the memory unit.

The judgment means judges the type of the object from which the echo as the reflected radar wave arrives at the transmitting and receiving means on the basis of the probability distribution of every type of objects stored in the probability distribution memory means. The echo corresponds to the change amount Y calculated by the change amount calculation means.

In the radar device according to the exemplary embodiment having the above structure, a transmitting wavelength λ of the radar wave to be transmitted and the predetermined observation period $T_{SW}$ are determined on the basis of the change amount Y of the signal intensity P of the arrival echo which is adjusted by fluctuation generated on the reflection surface of the object of each type as the detection target.

Because the phase of the echo as the reflected radar wave is changed according to the position of the reflecting surface of the object as the detection target, when the reflection surface of the object vibrates or fluctuates, a positional change of the reflection surface of the object is caused by the vibration or fluctuation, and the positional change of the reflection surface affects the phase change of the echo.

It is assumed that the object is an assembly comprised of a plurality of small reflection surfaces.

The positional vibration of the reflection surface of the object is changed according to a type of the object, such as metal, an outer skin of a person, clothes, and a part such as arms and legs of a person. The different fluctuation of the reflection surface of the object changes the probability distribution of the change amount Y. The radar device according to the exemplary embodiment of the present invention judges a type of an object on the basis of the change amount Y of the echo caused by the above phenomenon in fluctuation of the reflection surface of the object.

However, when the phase change amount $\Delta\phi$ of the echo arriving from each reflection surface of the object during the observation period $T_{SW}$ is not less than $\pi$, the amplitude of the received signal of the arrival echo received by the transmitting and receiving means follows Rayleigh distribution, where the transmitting and receiving means receives the mixed received signals transferred from various types of the objects present in the area around the own motor vehicle equipped with the radar device. This makes it difficult to observe and distinguish the fluctuation of the reflection surface of the object as the detection target. In other words, in the above case, the information expressing the fluctuation of the reflection surface of the object as the detection target does not appear on the change amount Y of the arrival echo, and no difference of the fluctuation of the reflection surface of the object is generated in the change amount Y. The above case makes it difficult for the radar device to correctly judge the type of an object on the basis of the change amount Y.

In order to eliminate the above problem, the radar device according to the exemplary embodiment of the present invention determines the wavelength $\lambda$ of the transmitted radar wave and the observation period $T_{SW}$ so that the fluctuation generated on the reflection surface of an object affects the change amount Y of the arrival echo from the object.

The phase change amount $\Delta\phi$ of the arrival echo during the observation period $T_{SW}$ depends on the observation period $T_{SW}$ and the wavelength $\lambda$ of the transmitted radar wave. Further, the phase change amount $\Delta\phi$ of the arrival echo depends on the magnitude of the fluctuation generated on the reflection surface of the object.

Accordingly, the wavelength $\lambda$ of the transmission radar wave and the observation period $T_{SW}$ are determined so that the fluctuation generated on the reflection surface of each type of an object as the detection target affects the change amount Y of the arrival echo from the object. Specifically, the wavelength $\lambda$ of the transmission radar wave and the observation period $T_{SW}$ are determined so that the phase change amount $\Delta\phi$ of the arrival echo from each reflection surface of the object does not exceed the value of $\pi$. This satisfies the above requirement for the fluctuation generated on the reflection surface of the object to affect the change amount Y of the arrival echo from the object.

The radar device according to the exemplary embodiment of the present invention having the above structure and functions can judge the type of the object on the basis of the arrival echoes from the objects as the detection targets. Accordingly, when a motor vehicle is equipped with the radar device, it is possible to determine a type of an object present in the area around of the motor vehicle. Further, it is possible for the motor vehicle to execute various safety processes on the basis of the judgment results of the radar device, which are not executed by a motor vehicle equipped with a conventional radar device. For example, the ECU in the motor vehicle equipped with the radar device according to the exemplary embodiment of the present invention can switch the driving processes on the basis of the type of the front object as the judgment results of the radar device. Thus, the present invention provides a superior radar device when compared with the conventional radar devices.

BRIEF DESCRIPTION OF THE DRAWINGS

A preferred, non-limiting embodiment of the present invention will be described by way of example with reference to the accompanying drawings, in which:

FIG. 1 is a block diagram schematically showing a configuration of a radar device according to an exemplary embodiment of the present invention;

FIG. 2A is a graph showing a relationship between a transmitting signal Ss, an echo signal Sr, and a beat signal BT;

FIG. 2B is a graph showing a power spectrum of the beat signal BT shown in FIG. 2A;

FIG. 3 is a view showing a relationship between an azimuth of each front object and a MUSIC spectrum;

FIG. 4 is a graph showing a structure of probability distribution tables of objects and data items stored in the probability distribution tables;

FIG. 7 is a view showing a structure of a radar device as a modification of the radar device shown in FIG. 1;

FIG. 8 is a flow chart showing a part of the target object estimation process as a modification of the target object estimation process shown in FIG. 6; and FIG. 9 is a flow chart showing a part of the target object estimation process as other modification of the target object estimation process shown in FIG. 6.

DETAILED DESCRIPTION OF THE PREFERRED EMBODIMENTS

Figure 5:
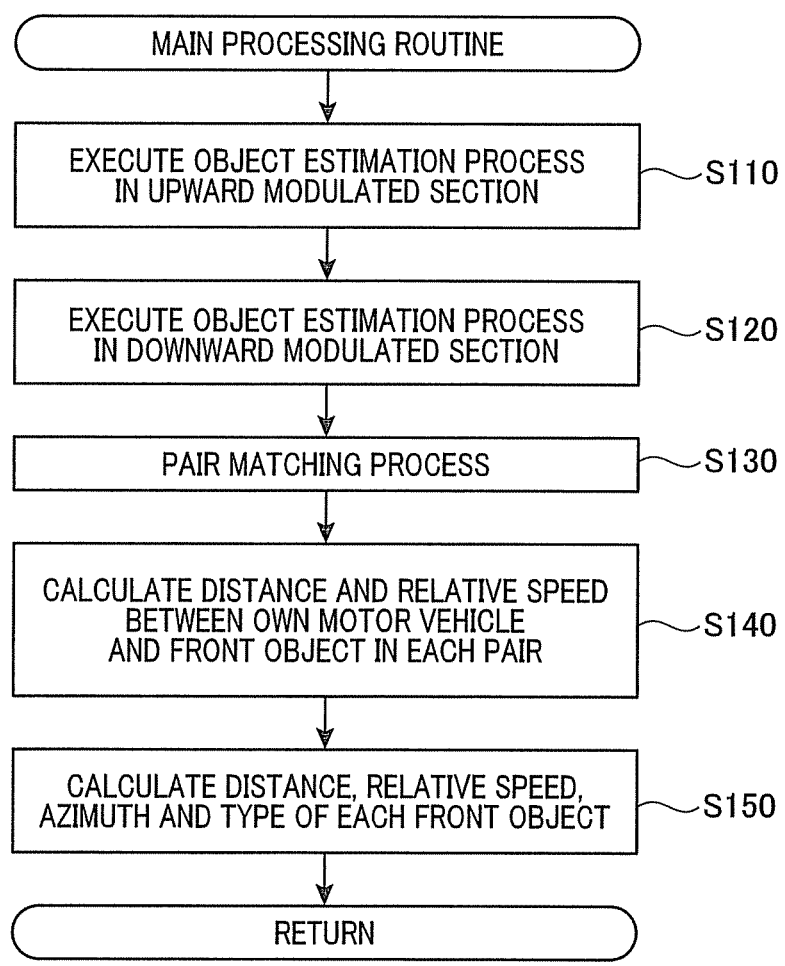
FIG. 5 is a flow chart showing a main processing routine executed by a signal processing unit in the radar device shown in FIG. 1.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of the radar device 1 according to an exemplary embodiment of the present invention with reference to FIG. 1 to FIG. 6.

FIG. 1 is a block diagram schematically showing a configuration of the radar device 1 according to the exemplary embodiment of the present invention.

The radar device 1 is a frequency modulated continuous wave (FMCW) radar device mounted on a motor vehicle. The FMCW radar device transmits radar wave in FMCW format and receives echoes as reflected radar waves. As shown in FIG. 1, the FMCW radar device 1 is comprised of an oscillator 11, an amplifier 13, and a distributor 15 and a transmitting antenna 17.

The oscillator 11 generates a millimeter high frequency signal. The millimeter high frequency is linearly changed, namely increased and decreased according to a time elapse. The amplifier 13 amplifies the millimeter high frequency signal generated by the oscillator 11. The distributor 15 distributes the millimeter high frequency signal amplified by the amplifier 13 into a transmitting signal Ss and a local signal L. The transmitting antenna 17 radiates a radar wave corresponding to the transmitting signal Ss.

FIG. 2A is a graph showing such a transmitting signal Ss and an echo signal Sr of a radar wave and a beat signal BT. FIG. 2B is a graph showing a power spectrum of the beat signal BT shown in FIG. 2A.

The upper graph in FIG. 2A shows a relationship between a transmitting signal Ss, an echo signal Sr, and a beat signal BT. The bottom graph in FIG. 2A shows the beat signal BT. As shown in FIG. 2A and FIG. 2B, the radar device 1 according to the exemplary embodiment generates and transmits a radar wave which is a frequency-modulated triangle (pyramidal) wave.

The radar device 1 is further comprised of a receiving antenna array 19, a receiving switch 21, an amplifier 23, a mixer 25, a filter 27, and an analogue to digital (A/D) converter 29. The receiving antenna array 19 is composed of a linear array antenna in which k antenna elements (k is a positive integer) are arranged in series in order to receive a radar wave (as a reflected radar wave) reflected from a front object. The receiving switch 21 selects one of the k antenna elements forming the receiving antenna array 19 and supplies an echo signal Sr obtained by the selected antenna element to a following stage. The amplifier 23 amplifies the echo signal Sr. The mixer 25 mixes the echo signal Sr amplified by the amplifier 23 with a local signal L, and generates a beat signal BT (see the bottom graph shown in FIG. 2A). The filter 27 removes unnecessary signal components from the beat signal BT generated by the mixer 25. The A/D converter 29 samples the filtered beat signal BT as the output of the filter 27, and converts the sampled output to digital data items. In the following explanation, each of the k antenna elements is expressed by k-th antenna (k=1, 2, . . . , and K).

The radar device 1 further includes a signal processing unit 30 and a memory unit 40. The signal processing unit is comprised of a microcomputer and peripheral elements. The memory unit 40 stores a probability distribution table which will be explained later in detail.

The signal processing unit 30 instructs the oscillator 11 to start and stop its operation, and executes the signal processing of the sampled data (digital data items) of the beat signal BT which is supplied from the A/D converter 29. The signal processing unit 30 transmits various information, for example, a current position, a relative speed, an azimuth, and a type of an object, obtained by the signal processing to an electric control unit (ECU) of a motor vehicle through an interface (not shown). For example, the radar device 1 is electrically connected to the ECU mounted on a motor vehicle through a communication cable. The ECU executes a radar cruise control. The radar device 1 executes a serial data communication with the ECU in order to provide the above information to the ECU. The radar device 1 is further electrically connected to a on-vehicle LAN.

It is possible to have a structure in which the radar device 1 is electrically connected to the vehicle LAN and provide the above information to the ECU through the vehicle LAN connected to the ECU.

The signal processing unit 30 in the radar device 1 instructs the oscillator 11 to start. The oscillator 11 generates and outputs a high frequency signal. The amplifier 13 receives the high frequency signal and amplifies it. The amplifier 13 outputs the amplified high frequency signal. When receiving the amplified high frequency signal, the distributor 15 distributes the received high frequency signal into transmitting signal Ss and a local signal L. The transmitting signal Ss is emitted from the transmitting antenna 17 as a radar wave.

On the other hand, each of antenna elements, which form a receiving antenna array 19, receives the reflected radar wave, which is transmitted from the transmitting antenna 17 and reflected by a front object or obstacle. Each of the antenna elements in the receiving antenna array 19 outputs a received signal (or an echo signal) Sr to the receiving switch 21.

The receiving switch 21 outputs the echo signal Sr of a k-th antenna element (k=1, 2, . . . , and K) only to the amplifier 23. The amplifier 23 amplifies the echo signal Sr and outputs it to the mixer 25.

The mixer 25 mixes the echo signal Sr with the local signal L supplied from the distributor 15 in order to generate the beat signal BT. This beat signal BT has a frequency difference component between the received signals Sr and the transmitting signal Ss. After the filter 27 removes unnecessary signal component from the beat signal BT, the A/D converter 29 amplifies the beat signal BT output from the filter 27. The signal processing unit 30 receives the amplified beat signal BT transmitted from the A/D converter 29.

The receiving switch 21 switches all of the antenna elements AN_1 to AN_K by a predetermined time. The A/D converter 29 executes the data sampling in synchronous with the switching time of the receiving switch 21.

The signal processing unit 30 separates the sampled data (digital data) of the beat signal BT sampled by the A/D converter 29 per antenna element. The signal processing unit 30 analyses the sampled data of the beta signal BT every antenna element by a known method, and estimates a distance R between a front object (by which a radar wave is reflected) and an own motor vehicle equipped with the radar device 1, a relative speed V between the radar device 1 and the front object, and an azimuth θ of the front object in the driving direction of the own motor vehicle. Further, the signal processing unit 30 detects a type of the front object by a special method according to the exemplary embodiment of the present invention. The special method will be explained later in detail.

When the transmitting antenna 17 transmits a transmitting signal Ss as a radar wave, and the receiving antenna array 19 receives an arrival echo signal as a received radar wave reflected by an object. As designated by dotted line shown in the upper diagram in FIG. 2A, the echo signal Sr is delayed by a period of time Tr which corresponds to a period of time necessary to travel a round trip of the transmitted radio wave between the radio device 1 and the front object. Further, the echo signal Sr is shifted by a Doppler-frequency fd corresponding to a relative speed V between the own motor vehicle equipped with the radio device 1 and the front object.

The period of time necessary to travel such a round trip is a time length counted from the time when the transmitting antenna 17 transmits the radar wave and the time when the receiving antenna array 19 receives the radio wave reflected from the front object. In other words, the above period of time corresponds to a distance R between the radio device 1 and the front object.

As can be understood from the bottom graph shown in FIG. 2A, the information regarding the period of time Tr and the frequency fd is expressed by a frequency difference of the beat signal BT during each period of time when the frequency of the transmitted signal Ss is increased in an upward modulated section and when the frequency of the transmitted signal Ss is decreased in a downward modulated section.

The signal processing unit 30 executes frequency transformation (Fourier transform) of the beat signal BT as sampled data (digital data) obtained by each antenna element in the receiving antenna array 19 during an upward modulated section and a downward modulated section (see the upper graph in FIG. 2A) for each in one modulation cycle Tm.

The signal processing unit 30 detects a peak frequency fp in a power spectrum of each antenna element during every modulated section. The signal processing unit 30 calculates the distance R and the relative speed V on the basis of the peak frequency fp=fb1 during the upward modulated section and the peak frequency fp=fb2 in the downward modulated section by using the following equations (1), where the distance R is a distance between the own motor vehicle equipped with the radar device 1 and a front object, and the relative speed V is a difference between the own motor vehicle and the front object.

$$R = \frac{c \cdot fr}{4 \cdot fm \cdot \Delta f} \quad (1)$$

$$V = \frac{c \cdot fd}{2 \cdot f0}$$

$$fd = \frac{fb1 - fb2}{2}$$

$$fr = \frac{fb1 + fb2}{2},$$

where c is a radio wave propagation speed, fm is a modulation frequency of the transmitting signal Ss, Δf is a frequency range of the transmitting signal Ss, and f0 is a central frequency of the transmitting signal Ss.

On the other hand, the echo signals received by each of the antenna elements in the receiving antenna array 19 contain a phase difference according to the arrival directions of the echoes. The signal processing unit 30 estimates the azimuth θ of the front object on the basis of the information regarding the phase difference contained in the beat signal BT.

There are known methods of detecting the azimuth of the presence of the front object as a detection target, for example, digital beam forming (DBF) method, Capon's method, ESPRIT method, MUSIC method, etc.

When the azimuth of the presence of the front object is detected on the basis of the MUSIC method, the signal processing unit 30 generates an autocorrelation matrix on the basis of the frequency transformed value at the peak frequency fp, as the frequency transformed value (Fourier transformed value) of the beat signal BT of each antenna element. The signal processing unit 30 calculates a MUSIC spectrum on the basis of an eigenvalue and eigenvector of the autocorrelation matrix.

FIG. 3 is a view showing a relationship between an azimuth θ of each front object (for example, a front running motor vehicles) and a MUSIC spectrum. When the signal processing unit 30 calculates such a MUSIC spectrum, as shown in FIG. 3, a sharp power peak is generated in the azimuth corresponding to the position of the front object such as a front moving motor vehicle in front of the own motor vehicle equipped with the radar device 1. In the exemplary embodiment, the signal processing unit 30 extracts the sharp power peak of the MUSIC spectrum, and estimates the azimuths θ1, θ2, . . . , and $θ_M$ of the frequency components of the arrival echoes corresponding to each of the peak frequencies fp.

As previously described, when calculating the distance R and the relative speed V, it is necessary for the signal processing unit 30 to specify a pair of the peak frequency fb1 in the upward modulated section and the peak frequency fb2 in the downward modulated section. However, when there is a plurality of front objects, the signal processing unit 30 detects a plurality of peak frequencies fp in each of the upward modulated section and the downward modulated section.

The signal processing unit 30 matches the peak frequency fb1 with the peak frequency fb2 in the direction of the arrival echoes as reflected radar waves on the basis of the estimation results of the azimuths θ1, θ2, . . . , and $θ_M$, and makes a pair of the peak frequency fb1 in the upward modulated section and the peak frequency fb2 in the downward modulated section. The signal processing unit 30 then estimates the distance R and the relative speed V between the front object and the radar device 1 mounted to the own motor vehicle by the above processes.

Further, the signal processing unit 30 calculates a power (or a received power) of each echo transmitted from each azimuth θ according to a predetermined equation, and calculates a difference (or a change amount Y) between the currently-received power and a previous received power before one modulated period T of each of the powers P1, P2, . . . , and $P_M$. The signal processing unit 30 judges a type of each front object, by which the radar wave emitted from the radar device 1 is reflected by the front object, and the echo as the reflected radar wave is transmitted to the radar device 1 on the basis of the change amount Y.

In general, the phase of the echo (or the reflected radio wave) is changed according to the position of the reflection surface of the front object. When the reflection surface of the front object is unstable, for example, vibrated, a phase change occurs in the echo (as the reflected radar wave) according to the vibration of the reflection surface of the front object.

Because it can be considered for a front object reflecting the arrived radar wave to have an assembly composed of a plurality of small reflection surfaces, a phenomenon to vibrate the reflection surface of the front object is changed according to the type of the reflection surface of the front object, such as metal surface, clothes worn by a person, an outer leg skin and an outer arm skin of a person.

That is, a different vibration, namely, a different fluctuation of the radar wave on the reflection surface has a different probability distribution of the change amount Y of the radar wave. The radar device 1 according to the exemplary embodiment of the present invention judges the type of the front object, by which a radar wave is reflected on the basis of the change amount Y caused by the above phenomenon.

For example, when arrival echoes are considered, which is reflected by a front object, and transmitted from the front object, the reflection wave at a time t can be expressed by the following equation (2).

$$x(t) = \sum_i \frac{C}{(4\pi)^3 (R(t) + \Delta R_i(t))^4} \exp \quad (2)$$

$$\left\{ j \cdot \left( 2\pi f \cdot t + \frac{4\pi (R(t) + \Delta R_i(t))}{\lambda} \right) \right\}$$

$$\approx \frac{C}{(4\pi)^3 R(t)^4} \exp\left\{ j \cdot \left( 2\pi f \cdot t + 4\pi \frac{R(t)}{\lambda} \right) \right\}$$

$$\sum_i \exp\left\{ j \cdot \frac{4\pi \Delta R_i(t)}{\lambda} \right\},$$

where C is determined by a transmitting gain, a receving gain, a transmission power and a RCS value, Ri(t) is a distance between the radar device 1 and the i-th reflection surface of the front object at time t, R(t) indicates an average value of the distance between the radar device 1 and a plurality of the reflection surfaces, ΔRj(t) indicates a difference between the distance Ri(t) and the average value, f designates a transmission frequency of the radar wave, and λ indicates a wavelength of the transmitted radar wave.

The equation (2) is made on the basis of an assumption in which the reflection surface of the front object is made of radar cross-section RCS, and the radar cross-section RCS is comprised of a plurality of small reflection surfaces which independently move. The reference character "C" in the above equation (2) is obtained by using a transmitting gain, a receiving gain, a transmission power and a RCS value.

In the equation (2), the distance Ri(t) between the radar device 1 and the i-th reflection surface of the front object at time t can be expressed by Ri(t)=R(t)+ΔRj(t), where R(t) indicates an average value of the distance between the radar device 1 and a plurality of the reflection surfaces, ΔRj(t) indicates a difference between the distance Ri(t) and the average value, f designates a transmission frequency of the radar wave, and λ indicates a wavelength of the transmitted radar wave.

Because ΔRj(t) is a very small value, the approximation equation x(t) is obtained by using R(t) instead of R(t)+ΔRj(t).

The echo, as the reflected radar wave reflected by the front object, at an observation time Tsw very-shortly progressed from the time t can be expressed by the following equation (3).

$$x(t+Tsw) = \sum_i \frac{C}{(4\pi)^3(R(t+Tsw)+\Delta R_i(t+Tsw))^4} \times \exp \quad (3)$$

$$\left\{j \cdot \left(2\pi f_{Tsw} \cdot t + \frac{4\pi(R(t+Tsw)+\Delta R_i(t+Tsw))}{\lambda}\right)\right\}$$

$$\approx \frac{C}{(4\pi)^3 R(t)^4} \exp(j \cdot 2\pi f \cdot t) \sum_i \exp$$

$$\left\{j \cdot \frac{4\pi(R(t)+v(t) \cdot Tsw + \Delta R_i(t)+\Delta v_i(t) \cdot Tsw)}{\lambda}\right\}$$

$$= \frac{C}{(4\pi)^3 R(t)^4}$$

$$\exp\left\{j \cdot \left(2\pi f \cdot t + 4\pi \frac{R(t)+v(t) \cdot Tsw}{\lambda}\right)\right\} \times$$

$$\sum_i \exp\left\{j \cdot \frac{4\pi(\Delta R_i(t)+\Delta v_i(t) \cdot Tsw)}{\lambda}\right\}.$$

In the equation (3), v(t) designates the relative speed of the front object by which the transmitted radar wave is reflected, Δvi(t) indicates a speed difference, namely, the fluctuation amount to the relative speed V(t) on the i-th reflection surface.

In the approximation equation (3), the frequency f at time t is used as the frequency $f_{TSW}$ at time t+$t_{SW}$.

The echoes as the reflected radar waves at time t and time t+Tsw can be approximated by the following equation (4). For example, the change amount Y can be expressed by the following equation (4) when a power ratio between the echoes as the reflected radar waves is calculated as the change amount Y.

$$Y = \log \frac{|x(t+Tsw)|^2}{|x(t)|^2} \quad (4)$$

$$\approx \log \left|\sum_i \exp\left\{j \cdot \frac{4\pi(\Delta R_i(t)+\Delta v_i(t) \cdot Tsw)}{\lambda}\right\}\right|^2 -$$

$$\log \left|\sum_i \exp\left\{j \cdot \frac{4\pi \Delta R_i(t)}{\lambda}\right\}\right|^2.$$

In the equation (4), the change amount Y is obtained by logarithmically amplifying the power ratio.

When the power ratio between the power of the echo as the reflected radar wave at time t+Tsw and the power of the echo as the reflected radar wave at time t is calculated, the change amount Y can be calculated as a value which is changed by ΔRi(t) and ΔVi(t). Therefore when the changed value Y is compared with a value in a probability distribution regarding the change amount Y every type of objects, which are experimentally obtained in advance, it is possible for the signal processing unit 30 to detect or judge the type of the front object.

However, when the phase change amount Δϕ of the echo as the reflected radar wave from each reflection surface between the observation period $T_{SW}$ is not less than π, the amplitude of the received signal of the echo at the receiving antenna array 19 obeys Rayleigh distribution, it is difficult for the signal processing unit 30 to detect the fluctuation or vibration of the arrival echo reflected from the reflection surface of the front object because the receiving antenna array 19 receives mixed reflected components from a plurality of the reflection surfaces.

In order to avoid this, the signal processing unit 30 in the radar device 1 according to the exemplary embodiment determines the transmission wavelength λ and the observation period $T_{SW}$ so that the phase change amount Δϕ of the arrival echo as the reflected radar wave reflected by each reflection surface of the front object does not exceed the value of π.

A description will now be given of the transmission wavelength λ and the observation period $T_{SW}$ in detail.

The phase change amount ΔϕI of the echo as the reflected radar wave from the i-th reflection surface of the front object can be expressed by Δϕi=ϕi (t+$T_{SW}$)−ϕI (t), where ϕi(t) is the phase of the arrival echo as the reflected radar wave from the i-th reflection surface of the front object at time t, and ϕ(t+$T_{SW}$) is the phase of the echo as the reflected radar wave from the i-th reflection surface of the front object at time t+$T_{SW}$.

When the phase change amount Δϕi of the arrival echo as the reflected radar wave from each reflection surface of the front object during the observation period $T_{SW}$ obeys the distribution form −π to +π, the amplitude distribution of the mixed wave of the arrival echoes as the reflected radar waves obeys Rayleigh distribution.

In other words, when the transmission wavelength λ and the observation period $T_{SW}$ are determined so that the phase ϕi of the arrival echo as the reflected radar wave from each reflection surface of the front object does not exceed the value π, the signal processing unit 30 can detect the fluctuation of the front object by the arrival echoes as the reflected radar waves received by the receiving antenna array 19. That is, it is sufficient that the transmission wavelength λ and the observation period $T_{SW}$ are determined by the following equation (5) so that the maximum value max {Δϕi} in Δϕi is less than the value of π.

$$\max\{\Delta\phi_i\} < \pi \quad (5).$$

On the other hand, the value of Δϕi can be expressed by the following equation (6).

$$\Delta\phi_i(t) = 2 \cdot \left(\frac{2\pi\Delta v_i(t) \cdot Tsw}{\lambda}\right). \quad (6)$$

It is considered that the fluctuation amount Δvi(t) of arrival echo as the reflected radar wave from each reflection surface obeys a normal distribution N (0, $\sigma_v^2$) of the average value of zero and a variance $\sigma_v^2$. It is sufficient to satisfy the following equation (7) when the transmission wavelength $\lambda$ and the observation period $T_{SW}$ are determined so that the fluctuation of the front object having the variance $\sigma_v^2$ can be observed within a range of $3\sigma_v$ (within a range of 99.7% probability range).

$$\frac{4\pi \cdot 3\sigma_v \cdot Tsw}{\lambda} < \pi. \quad (7)$$

In other words, it is sufficient that the transmission wavelength $\lambda$ and the observation period $T_{SW}$ satisfy the following equation (8).

$$\sigma_v < \frac{\lambda}{12 Tsw}. \quad (8)$$

The signal processing unit 30 in the radar device 1 according to the exemplary embodiment uses the equation (7) and the equation (8) and determines the transmission wavelength $\lambda$ and the observation period $T_{SW}$ on the basis of the variance $\sigma_v^2$ of the front object having the maximum fluctuation. It is sufficient to experiment in order to obtain the magnitude (as the variance $\sigma_v^2$) of the fluctuation.

The exemplary embodiment further prepares a probability table of each type of the front object which expresses the change amount Y of each front object by which the radar wave is reflected. A memory unit 40 stores such probability distribution tables which expresses the probability distribution of the change amount Y of each front object. This makes it possible to detect the type of the front object on the basis of the obtained change amount Y.

FIG. 4 is a graph showing a structure of probability distribution tables of objects, and data items stored in the probability distribution tables.

As shown in FIG. 4, the probability distribution table stores a probability distribution of the change amount Y of each object as a detection target, which has been obtained when each object reflects the radar wave transmitted from the radar device 1. Specifically, each probability distribution table stores cumulative distribution probabilities of a type of each object when a currently change amount Y becomes a value of not more than the change amount Y.

For example, it is possible to make such a probability distribution table of the change amount Y of each object by the following method.

The radar device 1 transmits radar waves to an object of each type and receives arrival echoes, as detection data items. The arrival echoes are reflected radar waves reflected by each of the objects. The radar device 1 makes a probability distribution table of the change amount Y on the basis of the detection data items. There is another method for the radar device 1 to execute a simulation, in addition to the above detection data items, in order to change the variance $\sigma_v^2$ in order to obtain a probability distribution of the change amount Y at each variance $\sigma_v^2$, and stores into the probability distribution table, the detection data items and the probability distribution table of the change amount Y at the variance $\sigma_v^2$ mostly close to the detection data items.

In the exemplary embodiment of the present invention, the cumulative probability distribution of each type of the object is stored in the probability distribution table.

When the signal processing unit 30 in the radar device 1 according to the exemplary embodiment detects the type of a front object, the signal processing unit 30 calculates the cumulative probability of the change amount Y obtained through the echoes as the reflected radar waves from the front object, and a difference between the calculated cumulative probability and the cumulative probability regarding adjacent change amount Y written in the probability table in order to distinguish the cumulative probability distribution. As a result, the signal processing unit 30 obtains a probability density of the change amount Y. It is therefore possible to store the probability density of the change amount Y instead of the cumulative probability distribution. Still further, it is possible to store information regarding a cumulative distribution function and a probability density function into the memory unit 40 instead of the probability distribution table of the change amount Y.

The front objects handled by the signal processing unit 30 in the radar device 1 according to the exemplary embodiment are a motor vehicle, a guard rail, a person, etc.

The probability distribution table stored in the memory unit 40 has the probability distribution regarding various types of objects such as objects made of metal, a person, etc. by which the radar waves are reflected. In particular, because the probability distribution table stored in the memory unit 40 contains a probability distribution of a standing person, and a probability distribution of a moving person, it is possible for the signal processing unit 30 in the radar device 1 to distinguish and recognize a standing person from a moving person and an object made of metal, etc.

Accordingly, when the signal processing unit 30 detects the presence of a moving person in front of the own motor vehicle equipped with the radar device 1 according to the exemplary embodiment, the radar device 1 executes vehicle control to decrease the vehicle speed. This makes it possible to avoid a traffic accident with the moving person. Still further, because the radar device 1 can distinguish the presence of a person from a guard rail, etc., it is possible for the radar device 1 to instruct the motor vehicle to avoid a collision with a person, and to collide with the guard rail instead of the person. Any conventional device does not have the above improved function of the radar device 1.

A description will now be given of the process executed by the signal processing unit 30 in the radar device 1 having the above improved function with reference to FIG. 5 and FIG. 6.

FIG. 5 is a flow chart showing a main processing routine executed by the signal processing unit 30 in the radar device 1 shown in FIG. 1. FIG. 6 is a flow chart showing a target object estimation process executed by the signal processing unit 30 in the radar device 1 shown in FIG. 1.

The signal processing unit 30 in the radar device 1 periodically executes the main processing routine shown in FIG. 5 every modulation cycle Tm. This executes a series of signal processing steps (S110 to S150) every modulation cycle Tm in order to estimate the distance R between the own motor vehicle and the front object, the relative speed V between the own motor vehicle and the front object, and the azimuth θ of the front object. Further, the signal processing unit 30 detects the type of the front object.

Specifically, the signal processing unit 30 executes the target object estimation process (composed of step S210 to S350 shown in FIG. 6) during the upward modulated section (S110 shown in FIG. 5) in one modulated cycle Tm on the basis of the sampled data of the beat signal BT. This beat signal BT is generated by arrival echoes received during one upward modulated period as a processing target period by the receiving antenna array 19. After this, the signal processing unit 30 executes the target object estimation process (composed of step S210 to S350 shown in FIG. 6) during the downward modulated section (S120 shown in FIG. 5) on the basis of the sampled data of the beat signal BT. This beat signal BT is also generated by arrival echoes received during the downward modulated period in one modulated cycle Tm as a processing target period by the receiving antenna array 19.

Figure 6:
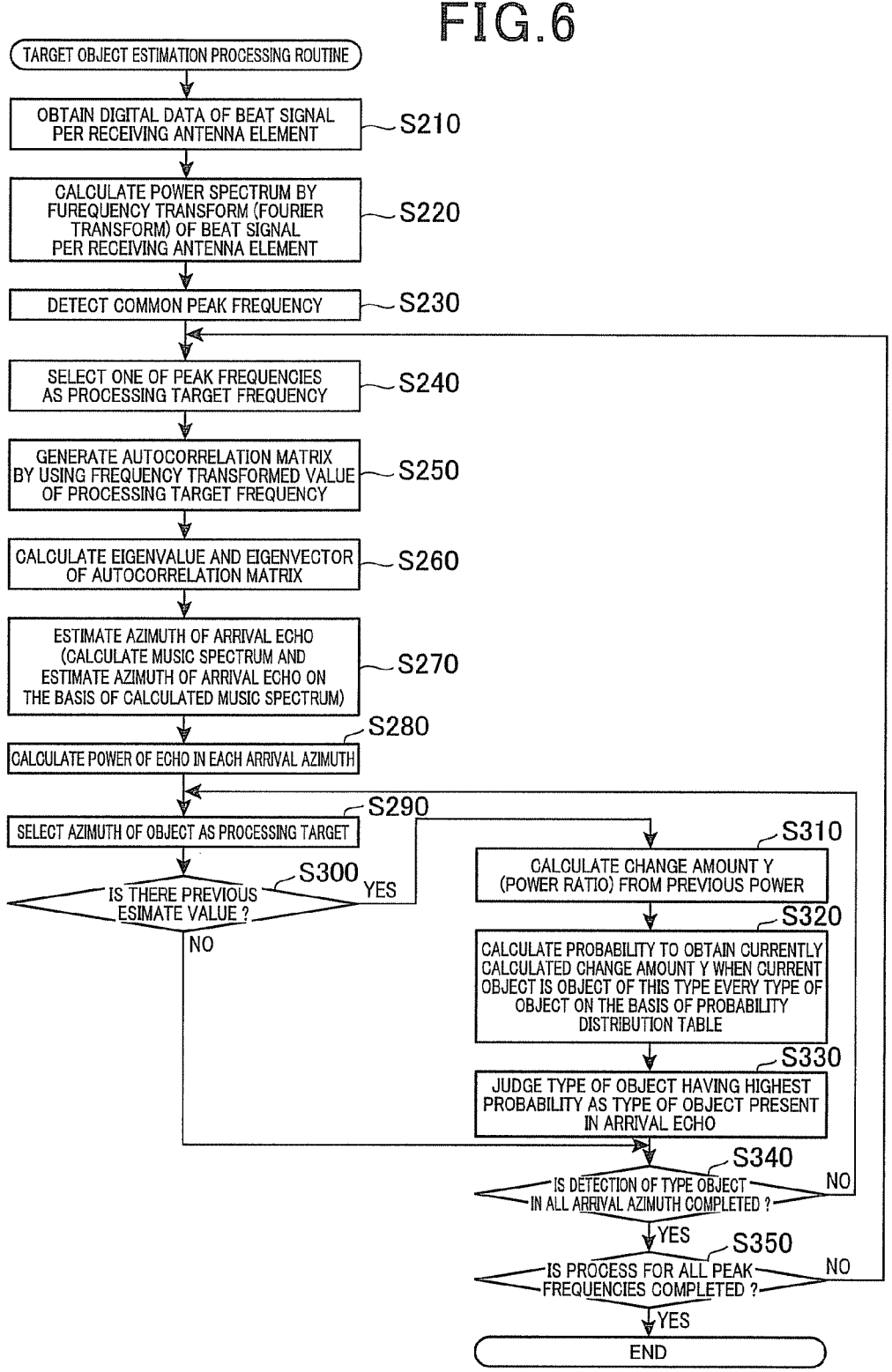
FIG. 6 is a flow chart showing a target object estimation process executed by the signal processing unit in the radar device shown in FIG. 1.

In the target object estimation process to detect the type of the target object shown in FIG. 6, the signal processing unit 30 obtains the sampled data of the beat signal BT during the processing target period every antenna element in the receiving antenna array 19 (step S210). The signal processing unit 30 executes the frequency transformation of the beat signal BT in each antenna element and calculates a power spectrum every antenna element (step S220). After this, the signal processing unit 30 selects the peak frequency fp which is commonly detected in each antenna element. In the exemplary embodiment, the signal processing unit 30 detects the peak value of the power spectrum in each antenna element and not less than a predetermined threshold value, and detects, as the peak frequency fp, each peak frequency of not less than the predetermined threshold value (step S230).

After completion of the peak frequency fp, the signal processing unit 30 selects one of the detected peak frequencies as a processing target (step S240), and generates a received vector $X=(x1, x2, \ldots, xk)^T$ in which frequency transformed values are arranged in the processing target frequency in each antenna element. The signal processing unit 30 calculates an autocorrelation matrix $Rxx1=E[XX^H]$ and an autocorrelation matrix $Rxx2=XX^H$ of the received vector X (step S250). In the above received vector X and the above autocorrelation matrixes $Rxx1=E[XX^H]$ and $Rxx2=XX^H$, T designates a transpose of a vector, H indicates a transpose of complex conjugation, xk indicates a frequency transformed value of the beat signal BT generated from the received signal by a k-th antenna element during the processing target modulated section.

By the way, a conventional method calculates an expected value $EE[XX^H]$ of the value $XX^H$ as the autocorrelation matrix Rxx in order to determine the azimuth of the front object.

On the other hand, it is necessary for the signal processing unit 30 in the radar device 1 according to the exemplary embodiment to calculate a simultaneous power of the arrival echo reflected from each of arrival azimuths of echoes form the objects in order to calculate the change amount Y. Accordingly, the signal processing unit 30 calculates the expected value $E[XX^H]$ of the value $XX^H$, and a simultaneous value of the value $XX^H$ by using the currently received vector X as the autocorrelation matrix Rxx2 in order to estimate the power spectrum.

It is possible to calculate, as the expected value $XX^H$, an average value of past values of $XX^H$ of a predetermined number including up-to-date received vector X.

After this, the signal processing unit 30 calculates eigenvalues $\lambda 1, \lambda 2, \ldots,$ and $\lambda_K (\lambda 1 \geq \lambda 2 \geq, \ldots, \lambda_K)$ and eigenvectors e1, e2, ..., and $e_K$ of the autocorrelation matrix. The signal processing unit 30 estimates the frequency of the arrival echo on the basis of the number of the eigenvalues of not less than a threshold value $\lambda$th of thermal noise power (Johnson-Nyquest noise power) (step S260).

When the signal processing unit 30 calculates a noise eigenvector $E_N$ and a steering vector $a(\theta)$ as a complex response of the array antenna to the azimuth $\theta$, and finally calculates MUSIC spectrum expressed by the evaluation function $P_{MU}(\theta)$ in the following equation (9), where the noise eigenvector $E_N$ is composed of eigenvectors $e_{M+1}, \ldots, e_K$ corresponding to (K-M) eigenvalues $\lambda_{M+1}, \ldots, \lambda_K$ of less than thermal noise power.

$$E_N = (e_{M+1}, e_{M+2}, \ldots, e_K) \qquad (9)$$
$$P_{MU}(\theta) = \frac{a^H(\theta)a(\theta)}{a^H(\theta)E_N E_N^H a(\theta)}.$$

The signal processing unit 30 extracts the peak value per M echoes from the MUSIC spectrum expressed by the above evaluation function $P_{MU}(\theta)$ in the equation (9). The signal processing unit 30 determines azimuths $\theta 1, \ldots, \theta_M$ corresponding to the extracted peaks as the azimuths of the echoes as the reflected radar waves from the front object (step S270).

The signal processing unit 30 estimates the power (or the received power) of the echoes in arrival as reflected radar waves from the azimuths $\theta 1, \ldots, \theta_M$ by the following equation (10) and temporarily stores the estimated power in the memory unit 40 (step S280).

Specifically, the signal processing unit 30 generates an array response matrix A, expressed by the following equation (10), by using steering vectors $a(\theta 1), \ldots, a(\theta_M)$ corresponding to the azimuths $\theta 1, \ldots, \theta_M$ in each of the echoes estimated in step S270. These echoes are targets to estimate the received power.

$$A=[a(\theta_1), a(\theta_2), \ldots, a(\theta_{M-1}), a(\theta_M)] \qquad (10).$$

The signal processing unit 30 calculates a diagonal component of the matrix S expressed by the following equation (11) by using the autocorrelation matrix Rxx2 as the array response matrix A and the spontaneous value.

$$S=(A^H A)^{-1} A^H \cdot Rxx2 \cdot A(A^H A)^{-1} \qquad (11).$$

A m-th diagonal component in the matrix S corresponds to the received power Pm in the azimuth $\theta$m (where, m=1, ..., M).

That is, the signal processing unit 30 calculates the diagonal component of the matrix S in order to estimate the power (received power) of the echo transmitted from each arrival azimuth $\theta 1, \ldots, \theta_M$ which are estimated in step S270. Although the signal processing unit 30 calculates the arrival azimuth of the echoes in step S270, the signal processing unit 30 extracts the power calculated by the above method of not more than the threshold value from the arrival azimuth of the echoes in step S280.

The signal processing unit 30 selects one of the arrival azimuths $\theta 1, \ldots, \theta_M$ of the echoes as a detection target (step S290), and judges whether or not a previous estimated value of the arrival echo transmitted from the selected arrival azimuth is stored (step S300).

That is, the signal processing unit 30 judges, on the basis of the received signal of the arrival echo during the target processing modulated section in one previous modulated cycle Tm, whether or not (1) the azimuth estimation and the power estimation at the same peak frequency fp of the current target object have been estimated; and (2) the power estimation of the echo arrived from the same azimuth of the current target object has been estimated.

When the above estimation processes have been executed, the signal processing unit 30 judges that the previous estimated value of the power is stored in the memory unit 40. On the other hand, when no above estimation processes have been executed, the signal processing unit 30 judges there is no previously-estimated value of the power.

When the signal processing unit 30 judges there is no estimated value of the power ("NO" in step S300), the operation flow goes to step S340.

On the other hand, if the signal processing unit 30 judges there is the previously-estimated value of the power ("YES" in step S300), the operation flow goes to step S310.

In step S310, the signal processing unit 30 calculates the change amount Y of the current power, which is different from the previously calculated change amount Y in the target azimuth to be detected. When the currently estimated power is designated by reference character P and the previously estimated power is designated by reference character Pb, the changed value currently calculated is expressed by the following equation (12).

$$Y=\log(P/Pb)=\log(P)-\log(Pb) \qquad (12).$$

In the equation (12), logarithmlic amplification is executed and the estimated power in decibel (dB) is stored (for example, in the memory unit (40) in order to simply calculate the change amount Y by using a difference between them.

Because the exemplary embodiment uses the value obtained before one modulated cycle Tm as the previous estimated power, the observation cycle $T_{SW}$ becomes equal to the modulated cycle Tm.

After completion of the above step, the operation flow goes to step S320. In step S320, the signal processing unit 30 calculates the probability Pr (hereinafter, referred to as the "generation probability P") for every type of the target objects to be detected on the basis of the information of the probability distribution according to the type of the target object in the probability distribution table stored in the memory unit 40. The above calculated probability Pr is the probability of obtaining the change amount Y when this change amount Y calculated in step S310 is the change amount Y calculated on the basis of the echo reflected from the type of the target object.

As previously described, because the probability distribution table contains a discrete cumulative probability of each change amount Y, the signal processing unit 30 calculates a difference between the cumulative probability of the change amount Y calculated in step S310 and the cumulative probability of the change amount Y of the adjacent power in order to calculate the probability density as the differentiation of the cumulative probability to the change amount Y. That is, in step S320, the signal processing unit 30 calculates the probability density of the change amount Y calculated in step S310, and calculates the generation probability Pr of the change amount Y every type of the object.

After calculating the generation probability Pr of each type of the object as the detection target, the signal processing unit 30 extracts the highest generation probability from the generation probabilities of the types of the objects, and judges that the object of this type reflects the radar waves and transmits the echo (step S330).

In step S340, it is checked whether or not the signal processing unit 30 judges the type of the object from which the echo is arrived in all of the arrival azimuths θ1, . . . , $θ_M$ (other than the azimuth eliminated in step S280) estimated in step S270.

When the detection result in step S340 indicates negative ("No" in step S340), the operation flow returns to step S290. In step S290, the azimuth is switched to other azimuth, and the signal processing unit 30 executes the process after step S300.

On the other hand, When the detection result in step S340 indicates affirmative ("Yes" in step S340), the operation flow goes to step S350. In step S350, the signal processing unit 30 selects all of the peak frequencies fp as the processing target. The signal processing unit 30 checks whether or not the series of steps 250 to S340 is executed for all of the peak frequencies fp. When the detection result in step S350 is negative ("No" in step S350), the operation flow returns to step S240. In step S240, the signal processing unit 30 switches the target frequency and executes the series of steps S250 to S340. On the other hand, when the detection result in step S350 is affirmative ("Yes" in step S350), the signal processing unit 30 completes the target object estimation process shown in FIG. 6.

When the signal processing unit 30 completes the target object estimation process shown in FIG. 6 during the upward modulated section and the downward modulated section, the operation flow goes to step S130 shown in FIG. 5. In step S130, the signal processing unit 30 executes the pair matching process in the peak frequencies during the upward modulated section and the downward modulated section in order to specify a combination of the peak frequencies fp=fb1 during the upward modulated section and a combination of the peak frequencies fp=fb2 in the downward modulated section. The signal processing unit 30 estimates the distance R and the relative speed V between the own motor vehicle equipped with the radar device 1 and the front object as the detection target on the basis of the specified combinations of the peak frequencies (step S140).

The signal processing unit 30 combines the arrival azimuths θ1, . . . , $θ_M$ of the echoes, which are estimated on the basis of the peak frequencies fp, and the information regarding to the type of the target objects by which radar waves are reflected as the echoes in the arrival azimuths θ1, . . . , $θ_M$, with the estimated distance R and the relative speed V, and outputs to the external electric control unit (ECU) through a communication interface (omitted from FIG. 1) the information regarding the distance R, the relative speed V and the azimuth θ and the type of the target objects which are present around the own motor vehicle (step S150). The signal processing unit 30 repeatedly executes the above process every modulated section Tm.

As previously described in detail, the radar device 1 according to the exemplary embodiment can estimate the type of the front object as the detection target in addition to the distance R and the relative speed V between the front object and the own motor vehicle equipped with the radar device 1. On the other hand, any conventional radar device cannot detect the type of the front object as the detection target.

The radar device 1 according to the exemplary embodiment of the present invention can detect and specify a type of each front object such as various objects made of metal like a motor vehicle and a guard rail, a standing person and a moving person, etc.

When a motor vehicle is equipped with the radar device 1 according to the exemplary embodiment having the structure and features previously described, it is possible for the ECU (electric control unit) to switch the control pattern of the own motor vehicle on the basis of the detected and specified type of the front object based on the detection result of the radar device 1. This makes it possible to avoid various accidents, for example a collision with a front object or a person.

By the way, the signal processing unit 30 in the radar device 1 detects and estimates the type of the front object on the basis of the comparison result between the probability distribution in the probability distribution table and the change amount Y obtained on the basis of the arrival echoes of the radar waves which are reflected from the front objects. It is possible for the radar device 1 to estimate in advance the probability of presence of front objects on the basis of road environmental information. For example, there are many persons on a road in an urban area, a small number of persons on a road in a suburb. On the other hand, there is usually no person on a highway.

That is, it is also possible for the radar device 1 to judge a type of the front object on the basis of the generation probability Pr of the change amount Y and the road environmental information, where the radar wave is reflected by the front object and an echo is transmitted from the front object as the detection target corresponding to the change amount Y.

A description will now be given of modifications of the radar device 1 with reference to FIG. 7 and FIG. 8. The modification of the radar device 1 judges a type of the front object on the basis of the generation probability Pr of the change amount Y and the road environmental information.

First Modification

FIG. 7 is a view showing a structure of a radar device 2 as a modification of the radar device 1 shown in FIG. 1.

In the radar device 2 as a modification of the radar device 1 shown in FIG. 1, a memory unit 41 stores a compensation table in addition to the probability distribution table, a signal processing unit 31 communicates with a navigation ECU 100 through an on-vehicle local area network (on-vehicle LAN), and the signal processing unit 31 executes a target object estimation process which is different from the target object estimation process shown in FIG. 6. The signal processing unit 31 corresponds to the signal processing unit 30 shown in FIG. 1, and the memory unit 41 corresponds to the memory unit 40 shown in FIG. 1.

Other components of the signal processing unit 31 are the same of those in the signal processing unit 30. The explanation of the same components is omitted here and the different features of the radar device 2 from the radar device 1 shown in FIG. 1 will be explained.

The signal processing unit 31 in the radar device 31 shown in FIG. 7 communicates with the navigation ECU 100 through the on-vehicle LAN. That is, the navigation ECU 100 supplies, to the signal processing unit 31, category information regarding the road information on the current road on which the own motor vehicle drives.

The navigation ECU 100 is connected to a current position detection unit 101 composed of a global positioning system (GPS) receiver and a road map data base 103. The current position detection unit 101 detects the current position of the own motor vehicle equipped with the radar device 2. The navigation ECU 100 repeatedly executes a road environment information transmission process in order to obtain the current position information of the own motor vehicle transferred from the current position detection unit 101 (step S410). The navigation ECU 100 judges the category of road environmental information of the own motor vehicle corresponding to the current position indicated by the current position information on the basis of the information stored in the road map data base 103 (step S420).

The navigation ECU 100 transmits the obtained category information of the road environment at the current position of the own motor vehicle to the radar device 2 through the on-vehicle LAN (step S430).

The road map data base 103 stores area information indicating that the current area on which the own motor vehicle drives is one of a suburb and a town (or an urban area). Further, the road map data base 103 stores area information indicating that a current road is a highway or not.

That is, in step S420, the signal processing unit 31 in the radar device 2 specifies the current road on which the own motor vehicle equipped with the radar device 1 drives, and judges whether or not the current road is a highway. When the judgment result in step S420 indicates that the current road is a highway, the signal processing unit 31 judges that the category of road environmental information of the current road corresponds to the highway. On the other hand, when the judgment result in step S420 indicates that the current road is not a highway, the signal processing unit 31 determines that the category of road environmental information of the current road corresponds to a suburbs or an urban area (a city or a town).

When the signal processing unit 31 executes the above process, the navigation ECU 100 transfers the information regarding the determined category of road environmental information of the current road to the signal processing unit 31 in the radar device 2.

FIG. 8 is a flow chart showing a part of the target object estimation process as the modification of the target object estimation process shown in FIG. 6 executed by the signal processing unit 31 in the radar device 2 according to the first modification.

The signal processing unit 31 successively receives the above category information of the current road from the navigation ECU 100. After completion of the process (in step S320) in the target object estimation process (see FIG. 6), the signal processing unit 31 executes a series of steps S510 to S540 shown in FIG. 8, instead of the process in step S330.

Specifically, the signal processing unit 31 specifies the category of the road environmental information corresponding to the current road on which the own motor vehicle drives (step S510).

The signal processing unit 31 reads out, from the compensation table stored in the memory unit 41, a compensation coefficient W of each type of the front object as the detection target as a combination of compensation coefficients W corresponding to the specified category (step S520).

The signal processing unit 31 multiplies the generation probability (probability density) Pr of the change amount Y, which is calculated every type of the front object in step S320, with the corresponding compensation coefficient W of each type of the front object as the detection target. The signal processing unit 31 calculates the probability $Z = W \cdot Pr$ of the detection target by which the radar wave is reflected and with which the change amount Y is calculated (step S530).

As shown in FIG. 7, the compensation table stores a set of compensation coefficients W of each type of a front object as a detection target per category of the road environmental information of each of a city or a town, a suburb, a highway, etc. For example, a set of compensation coefficients W for a town or a city contains the following compensation coefficients W:

Compensation coefficient W11 for standing person is ⅓ (W11=⅓);

Compensation coefficient W12 for moving person is ⅓ (W12=⅓); and

Compensation coefficient W13 for object made of metal is ⅓ (W13=⅓).

A set of compensation coefficients W for a suburb contains the following compensation coefficients W:

Compensation coefficient W21 for standing person is 0.25 (W21=0.25);

Compensation coefficient W22 for moving person is 0.25 (W22=0.25); and

Compensation coefficient W23 for standing person is 0.5 (W23=0.5). A set of compensation coefficients W for a highway contains the following compensation coefficients W:

Compensation coefficient W31 for standing person is 0 (W31=0);

Compensation coefficient W32 for moving person is 0 (W32=0); and

Compensation coefficient W33 for standing person is 1 (W33=1).

When the own motor vehicle drives in a suburb, the signal processing unit 31 multiplies the generation probability Pr of the change amount Y calculated on the basis of the probability distribution of a standing person by the compensation coefficient W21=0.25. When the front object as the detection target is a standing person, the signal processing unit 31 calculates the probability Z=0.25·Pr of the standing person.

Similarly, the signal processing unit 31 multiplies the generation probability Pr of the change amount Y calculated on the basis of the probability distribution of a moving person by the compensation coefficient W22=0.25. The signal processing unit 31 calculates the probability Z=0.25·Pr of the standing person when the front object as the detection target is the moving person.

Further, the signal processing unit 31 multiplies the generation probability Pr of the change amount Y calculated on the basis of the probability distribution of an object made of metal by the compensation coefficient W23=0.5. When the front object as the detection target is an object made of metal, the signal processing unit 31 calculates the probability Z=0.5·Pr of the object made of metal.

The signal processing unit 31 judges that the type of the front object having the calculated maximum probability Z is the target object by which the radio wave is reflected as the arrival echo (step S540).

After this, the signal processing unit 31 executes the series of the processes from step S340.

As previously described in detail, the radar device 2 according to the modification of the radar device 1 detects the type of the front object, by which the radar wave is reflected, on the basis of road environmental information. It is therefore possible for the signal processing unit 31 to determine the type of a front object with high accuracy on the basis of the pre-estimation using the road environmental information.

In the modification, the signal processing unit 31 judges the road environmental information by using the road map data base 103 and the current position detection unit 101. However, the concept of the present invention is not limited by this modification. For example, it is possible for the signal processing unit 31 to detect the road environmental information on the basis of the driving speed of the own motor vehicle.

Second Modification

A description will now be given of a radar device 3 according to a second modification with reference to FIG. 9.

FIG. 9 is a flow chart showing a part of the target object estimation process as other modification of the target object estimation process shown in FIG. 6.

In the radar device 3 according to the second modification of the radar device 1, a signal processing unit 32 receives speed information of the own motor vehicle from a speed sensor 105 shown in FIG. 9, instead of the category of the road environmental information through the navigation ECU 100. Further, the signal processing unit 32 executes the target object estimation process shown in FIG. 9, which is different from the target object estimation process shown in FIG. 6.

Other components of the signal processing unit 32 are the same as those in the signal processing unit 30. The explanation of the same components is omitted here and the different features of the radar device 3 from the radar devices 1 and 2 shown in FIG. 1 and FIG. 7 will be explained.

The signal processing unit 32 in the radar device 3 according to the second modification receives the speed information of the own motor vehicle from the speed sensor 105, instead of the category information of the road environment of the current road, on which the own motor vehicle drives, supplied from the navigation ECU 100. After completion of the process shown in step S320, the signal processing unit 32 executes the series of steps S610 to S640 shown in FIG. 9.

Specifically, the signal processing unit 32 estimates the road environment of the area around the own motor vehicle on the basis of the speed information obtained from the speed sensor 105 (step S610). That is, the signal processing unit 3 calculates an average vehicle speed during a period from a past time to the current time, for example, during past five minutes, and judges the category of the road information of the area around the own motor vehicle on the basis of the calculated average vehicle speed as an index.

When the calculated average speed is less than a first boundary value (for example, 30 km/h), the signal processing unit 32 judges that the category information of road environment is a city or a town. On the other hand, when the calculated average speed is not less than the first boundary value (for example, 30 km/h) and less than a second boundary value (for example, 60 km/h), the signal processing unit 32 judges that the category information of road environment is a suburb. Further, when the calculated average speed is not less than the second boundary value (for example, 60 km/h), the signal processing unit 32 judges that the category information of road environmental is a highway.

After completion of the estimation of the road environment, like the processes in steps S520, and S530, the signal processing unit 32 reads out the compensation coefficient W of each type of the front object corresponding to the category of the road environmental information of the area around the own motor vehicle in the compensation table stored in the memory unit 40 (step S620). The signal processing unit 32 multiplies each generation probability (probability density) Pr of the change amount Y for each type of the front object from the probability distribution table by the corresponding compensation coefficient W of each type of the front object. This makes it possible to calculate, every type of the front objects, the probability Z (Z=W·Pr) as the detection target by which the radar wave is reflected as the arrival echo (step S630).

Similar to the process in step S540, the signal processing unit 32 judges that the type of the front object having the calculated maximum probability Z is the target object by which the radio wave is reflected as the arrival echo (step S640).

After this, the signal processing unit 31 executes the series of the processes from step S340.

Because the radar device 3 according to the second modification judges the type of the front object as the detection target on the basis of the road environmental information, it is possible to determine the type of the front object on the basis of the pre-estimation using the road environmental information with high accuracy. In particular, because the radar device 3 according to the second modification estimates the road environment on the basis of the vehicle speed, it is possible for a motor vehicle without any road map data base 103 and current position detection unit 101 to judge the type of the front object while considering the road environment. This makes it possible to apply the radar device 3 to various types of motor vehicles and other applications.

As previously described in detail, the oscillator 11, the amplifier 13, the transmitting antenna 17, the receiving antenna array 19, the receiving switch 21 and the amplifier 23 correspond to transmitting and receiving means used in the claims.

Further, the process in step S280 executed by the signal processing units 30, 31 and 32 corresponds to one example of the processes executed by detection means used in the claims. Still further, the process in step S310 executed by the signal processing units 30, 31 and 32 correspond to one example of the processes executed by change amount calculation means used in the claims.

The memory area in the memory unit 40 storing the probability distribution table corresponds to one example of probability distribution memory means. The process in steps S320 and S330 executed by the signal processing unit 30 or the processes in steps S320, S620 to S640 executed by the signal processing unit 31 or the processes in step S320, S620 to S640 executed by the signal processing unit 32 correspond to one example executed by judgment means used in the claims.

Still further, the process in step S510 executed by the signal processing unit 31 or the process in step S610 executed by the signal processing unit 32 correspond to one example executed by environmental estimation means used in the claims.

The mixer 25 in the radar devices 1, 2 and 3 corresponds to beat signal generation means used in the claims. The processes in steps S110 to S140 executed by the signal processing units 30, 31 and 32, and the processes in steps S210 to S270 in the target object estimation process correspond to the processes executed by signal analysis means used in the claims.

The concept of the present invention is not limited by the exemplary embodiment and modifications which use frequency modulated continuous wave (FMCW) radar device, as previously described. For example, it is possible to apply the concept of the present invention to radar devices having a different method other than the FMCW method, for example, to a radar device of a stepped frequency waveforms (SFW) method.

Still further, it is possible to apply the radar device according to the present invention to various applications other than on-vehicle radar devices.

Although the radar devices 1, 2 and 3 according to the present invention detect the type of front objects such as person and object made of metal such as motor vehicles, it is possible to detect the type of various objects other than person and motor vehicles.

Although the radar devices 1, 2 and 3 according to the present invention estimate the road environment information by using one of the road map data base 103 and the speed sensor 105, it is possible for the radar device to estimate the road environmental information by using both the road map data base 103 and the speed sensor 105.

(Other Features of the Present Invention)

In the radar device according to the exemplary embodiment of the present invention, the probability distribution memory means stores at least the probability distribution obtained when the object, by which the radar wave is reflected, is made of metal, and the probability distribution obtained when the object, by which the radar wave is reflected, is a person. Further, it is preferable for the judgment means to detect a person and an object made of metal independently, by which the radar wave is reflected, on the basis of the probability distributions stored in the probability distribution memory means.

When the radar device according to the exemplary embodiment is applied to motor vehicles, namely, a motor vehicle is equipped with the radar device having the above structure, it is possible to switch the vehicle control on the basis of the judgment results which indicate that the front object is a motor vehicle, a guard rail, a standing person or a walking person. This provides the safe driving.

When a motor vehicle is equipped with a conventional radar device, and the motor vehicle is in the case that the motor vehicle avoids a collision with a walking person, the motor vehicle cannot collide with a guard rail instead of the walking person.

On the other hand, the ECU in a motor vehicle equipped with the radar device according to the exemplary embodiment of the present invention can execute the avoidance control to avoid the collision with the walking person and to collide with the guard rail instead of the walking person on the basis of the judgment result of the radar device.

It is more preferable for the probability distribution memory means as the memory unit to store a probability distribution when a person stops and a probability distribution when a person is walking. The radar device judges the standing person and the walking person on the basis of these probability distributions. This structure of the radar device makes it possible to further avoid a collision with an object while considering the type of the object on the basis of the judgment result of the judgment means in the radar device.

In the radar device according to the exemplary embodiment of the present invention, the judgment means has a following structure in order to judge or determine a type of an object which transmits the echo. That is, the judgment means calculates a generation probability of the change amount Y calculated by the change amount calculation means on the basis of the probability distribution for the type of the object, corresponding to the change amount Y, stored in the probability distribution memory means. The judgment means judges that the type of the object having the calculated maximum generation probability is the type of the object corresponding to the change amount Y calculated by the change amount calculation means.

It is more preferable for the judgment means to judge or determine the type of the object on the basis of road environmental information in addition to the method using the probability distributions previously described. That is, it is preferable that the radar device according to the exemplary embodiment of the present invention is mounted to a motor vehicle. The radar device further has an environmental estimation means. The environmental estimation means estimates road environmental information of an area around the motor vehicle. The judgment means calculates a probability when the object corresponding to the change amount Y calculated by the change amount calculation means is the object of a type as a detection target which reflects radar waves on the basis of the probability distribution stored in the probability distribution memory means and the road environmental information estimated by the environmental estimation means. The judgment means judges a type of an object, which corresponds to the change amount Y calculated by the change amount calculation means, on the basis of the probability of each type of the objects as the detection targets and reflect the radar waves.

The probability for the object which emits the echo as the reflected radar wave to be present is changed according to road environment of a road on which the own motor vehicle equipped with the radar device drives. In other words, using the road environmental information as an index, it is possible to previously estimate a possibility for each type of an object to be present in the area around the own motor vehicle. For example, the possibility for a person to be present in the area around the own motor vehicle is changed according to whether it is a highway on which the own motor vehicle drives at high speed, or a road on which the own motor vehicle drives in a city, a town, or a suburb. Accordingly, when the radar device has the function to consider the road environmental information of the road on which the own motor vehicle drives, it is possible for the judgment means in the radar device to judge a type of the object with high accuracy.

In the radar device, the judgment means calculates a generation probability when the object corresponding to the change amount Y calculated by the change amount calculation means is the object of a type as detection target which reflects radar waves on the basis of the probability distribution stored in the probability distribution memory means. The judgment means calculates the probability when the object corresponding to the change amount Y calculated by the change amount calculation means is the object of the type as detection target by adding a compensation corresponding to the road environmental information calculated by the environmental estimation means to the generation probability.

For example, the judgment means calculates the probability for the object which transmits the echo as the reflected radar wave corresponding to the calculated change amount Y to be a type of the object by multiplying the calculated generation probability with a corresponding compensation coefficient.

It is possible for the environmental estimation means to have the following function to directly or indirectly read out the road environmental information expressing road environment of each area.

In the radar device, the environmental estimation means obtains the road environmental information, corresponding to a current road on which the motor vehicle drives, from road environment data base which stores data expressing road environment of each area, and the environmental estimation means estimates that the road environment of the area on which the motor vehicle drives is the road environment indicated by the obtained road environmental information.

For example, the environmental estimation means receives data (for example, data items indicating categories of the road environment as a city, a town, a suburb, a highway, etc.) expressing road environmental information of the area corresponding to the present position of the own motor vehicle detected from the road map data base as the road environment data base by the current position detection unit such as a GPS (global positioning system) receiver.

The environmental estimation means estimates road environment in the area around the own motor vehicle on the basis of the received data items. Because motor vehicles are usually equipped with road map data base and a position detector such as a GPS receiver, when the radar device has the environmental estimation means having the above structure, it is possible to estimate the road environment information in the area around the own motor vehicle.

In order for the environmental estimation means to have the above structure and function, it is necessary to install the road environmental data base in the radar device or the own motor vehicle, and for the radar device to be equipped with a communication interface in order to receive the data items from an external road environmental data base. This prevents the radar device to realize the function to correctly judge and recognize a type of an object on the basis of the road environmental information with low cost.

In order to avoid the above problem and to realize the demand, it is acceptable for the environmental estimation means in the radar device to estimate the road environment of the area on which the motor vehicle drives on the basis of a driving speed of the motor vehicle.

In an area with many intersections, a motor vehicle usually drives at a low speed. On the other hand, the motor vehicle drives at fast in an area with less number of intersections. Further, the motor vehicle drives at a high speed in a highway without any intersection. Accordingly, it is possible for the radar device to estimate the current road environment on the basis of the driving speed of the motor vehicle. This makes it possible for the radar device to judge a type of an object on the basis of the road environmental information obtained by the vehicle speed without any road map data base.

It is possible to apply the radar device according to the exemplary embodiment to a radar device using one of a frequency modulated continuous wave (FMCW) method and a stepped frequency waveform (SFW) method.

Because the radar device according to the exemplary embodiment can detect the distance between the own motor vehicle and an object as a detection target, an azimuth of the object, the moving speed of the object, etc., it is possible for the ECU mounted on the own motor vehicle to execute the driving control of the motor vehicle on the basis of the judgment result of the radar device.

The transmitting and receiving means in the radar device has a transmitting antenna and a receiving antenna array. For example, the transmitting antenna emits the radar waves on the basis of one of a frequency modulated continuous wave (FMCW) method or a stepped frequency waveform (SFW) method. The receiving antenna array is comprised of a plurality of receiving antenna element which receive echoes as the radar waves reflected by the objects as the detection targets.

It is possible to apply the radar device according to the exemplary embodiment of the present invention to a FMCW radar device and a SFW radar device when the radar device further has a beat signal generation means and a signal analysis means. The beat signal generation means mixes the received signals of the echoes received by each of the receiving antenna elements in the receiving antenna array and transmitted signal of the radar waves emitted by the transmitting antenna, and the beat signal generation means generates a beat signal every receiving antenna element. The signal analysis means detects a distance between the motor vehicle equipped with the radar device and the object by which the radar wave is reflected and an azimuth of the object on the basis of the beat signals every receiving antenna element.

Further, the detection means detects the signal intensity of the reflected radar wave as the arrival echo from the object every object having a different distance and azimuth on the basis of the beat signal of each of the receiving antenna element generated by the beat signal generation means. The change amount calculation means calculates, every object by which the radar wave is reflected and emits the echo as the reflected radar wave, a change amount Y of the signal intensity P of the currently-received echo corresponding to the previously calculated signal intensity Pb on the basis of the signal intensity P of the currently-received echo, transmitted from the object, detected by the detection means and the previous signal intensity Pb of the previous echo, transmitted from the object, received by the transmitting and receiving means, and detected by the detection means at a time after a previous observation period $T_{SW}$ counted from the receiving time of the previous-received echo to the time when the transmitting and receiving means received the current echo. The judgment means judges the type of the object on the basis of the change amount Y calculated by the change amount calculation means and the probability distribution of the type of the object stored in the probability distribution memory means.

The radar device according to the exemplary embodiment of the present invention can specify a type of each front object and a position (a distance and an azimuth) of each front object present in front of own vehicle, and the radar device recognize the state of the area around the radar device. When the radar device is applied to motor vehicles, an electric control unit of the motor vehicle can execute optimum drive control on the basis of the position and type of front objects which are present in front of the motor vehicle, and avoid a traffic accident from occurring on the basis of the obtained state of the area around the motor vehicle.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A radar device comprising:

transmitting and receiving means for emitting radar waves and receiving echoes of signals of the radar waves which are reflected by various types of objects as detection targets;

detection means for detecting a signal intensity of each arrival echo on the basis of the received signals of the arrival echoes received by the transmitting and receiving means;

change amount calculation means for calculating a change amount Y which is a difference between a current signal intensity P of a current arrival echo and a previous signal intensity Pb of a previous arrival echo detected by the detection means before a predetermined observation period $T_{SW}$ corresponding to the current signal intensity P of the current arrival echo;

probability distribution memory means for storing, every type of the objects as the detection targets, a probability distribution of the change amount Y of the arrival echo transmitted from each type of the object, calculated on the basis of the arrival echo as the radar wave reflected by the object of each type and arriving at the transmitting and receiving means; and judgment means for judging the type of the object by which the radar wave is reflected and from which the arrival echo arrives at the transmitting and receiving means corresponding to the change amount Y calculated by the change amount calculation means on the basis of the probability distribution of every type of objects stored in the probability distribution memory means, wherein a transmitting wavelength λ of the radar wave and the predetermined observation period $T_{SW}$ are determined on the basis of the change amount Y of the signal intensity P of the arrival echo which is adjusted by fluctuation generated by the object of each type as the detection target.

2. The radar device according to claim 1, wherein the probability distribution memory means stores at least the probability distribution obtained when the object, by which the radar wave is reflected, is made of metal, and the probability distribution obtained when the object, by which the radar wave is reflected, is a person, and wherein the judgment means is configured to distinguish a person and an object made of metal, by which the radar wave is reflected, on the basis of the probability distributions stored in the probability distribution memory means.

3. The radar device according to claim 1, wherein the judgment means calculates a generation probability of the change amount Y calculated by the change amount calculation means on the basis of the probability distribution for the type of the object, corresponding to the change amount Y, stored in the probability distribution memory means, and the judgment means judges that the type of the object having the calculated maximum generation probability is the type of the object corresponding to the change amount Y calculated by the change amount calculation means.

4. The radar device according to claim 1, wherein the radar device is mounted to a motor vehicle;

the radar device further comprising environmental estimation means for estimating road environmental information of an area around the motor vehicle, wherein the judgment means calculates a probability when the object corresponding to the change amount Y calculated by the change amount calculation means is the object of the type as the detection target which reflects radar waves on the basis of the probability distribution stored in the probability distribution memory means and the road environmental information estimated by the environmental estimation means, and the judgment means judges the type of the object corresponding to the change amount Y calculated by the change amount calculation means on the basis of the probability of each type of the objects as the detection targets that reflect the radar waves.

5. The radar device according to claim 4, wherein the judgment means calculates a generation probability when the object corresponding to the change amount Y calculated by the change amount calculation means is the object of a type as detection target which reflects radar waves on the basis of the probability distribution stored in the probability distribution memory means, and the judgment means calculates the probability when the object corresponding to the change amount Y calculated by the change amount calculation means is the object of the type as detection target by adding a compensation corresponding to the road environmental information calculated by the environmental estimation means to the generation probability.

6. The radar device according to claim 4, wherein the environmental estimation means obtains the road environmental information, corresponding to a current road on which the motor vehicle drives, from a road environment data base which stores data expressing road environment of each area, and the environmental estimation means estimates that the road environment of the area on which the motor vehicle drives is the road environment indicated by the obtained road environmental information.

7. The radar device according to claim 4, wherein the environmental estimation means estimates the road environment of the area on which the motor vehicle drives on the basis of a driving speed of the motor vehicle.

8. The radar device according to claim 1, wherein the radar device is a radar device using one of a frequency modulated continuous wave (FMCW) method and a stepped frequency waveform (SFW) method.

9. The radar device according to claim 1, wherein the transmitting and receiving means is comprised of a transmitting antenna and a receiving antenna array, the transmitting antenna emits the radar waves on the basis of one of a frequency modulated continuous wave (FMCW) method and a stepped frequency waveform (SFW) method, and the receiving antenna array is comprised of a plurality of receiving antenna elements which receive echoes as the radar waves reflected by the objects as the detection targets, the radar device further comprises beat signal generation means and signal analysis means, wherein the beat signal generation means mixes the received signals of the arrival echoes received by each of the receiving antenna elements in the receiving antenna array and transmitted signal of the radar waves emitted by the transmitting antenna, and the beat signal generation means generates a beat signal every receiving antenna element, the signal analysis means detects a distance between the motor vehicle equipped with the radar device and the object by which the radar wave is reflected and an azimuth of the object on the basis of the beat signals every receiving antenna element, the detection means detects the signal intensity of the reflected radar wave as the arrival echo arrived from the object every object having a different distance and an azimuth on the basis of the beat signal of each of the receiving antenna element generated by the beat signal generation means, the change amount calculation means calculates, every object by which the radar wave is reflected and emits the arrival echo as the reflected radar wave, a change amount Y of the signal intensity P of the currently-received echo corresponding to the previously calculated signal intensity Pb on the basis of the signal intensity P of the currently-received echo, transmitted from the object, detected by the detection means and the previous signal intensity Pb of the previous echo, transmitted from the object, received by the transmitting and receiving means, and detected by the detection means at a time after a previous observation period $T_{SW}$ counted from the receiving time of the previous-received arrival echo to the time when the transmitting and receiving means received the current arrival echo, and the judgment means judges the type of the object on the basis of the change amount Y calculated by the change amount calculation means and the probability distribution of the type of the object stored in the probability distribution memory means.

\* \* \* \* \*